(12) United States Patent
Nakai et al.

(10) Patent No.: US 9,121,588 B2
(45) Date of Patent: Sep. 1, 2015

(54) DISPLAY DEVICE

(71) Applicants: Yutaka Nakai, Kanagawa-ken (JP);
Tsuyoshi Hioki, Tokyo (JP)

(72) Inventors: Yutaka Nakai, Kanagawa-ken (JP);
Tsuyoshi Hioki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 278 days.

(21) Appl. No.: 13/676,355

(22) Filed: Nov. 14, 2012

(65) Prior Publication Data

US 2013/0121026 A1    May 16, 2013

(30) Foreign Application Priority Data

Nov. 15, 2011   (JP) .................................. 2011-249894

(51) Int. Cl.
| | |
|---|---|
| *F21V 7/04* | (2006.01) |
| *F21V 21/00* | (2006.01) |
| *F21V 7/00* | (2006.01) |
| *F21V 8/00* | (2006.01) |

(52) U.S. Cl.
CPC ............. *F21V 21/00* (2013.01); *F21V 7/0066* (2013.01); *G02B 6/0078* (2013.01); *G02B 6/0068* (2013.01)

(58) Field of Classification Search
CPC ... G02B 6/0068; G02B 6/0078; G02B 6/0076
USPC .................. 362/608, 609, 611, 616, 630–631
See application file for complete search history.

(56) References Cited

U.S. PATENT DOCUMENTS

| | | | |
|---|---|---|---|
| 2009/0243980 A1 | 10/2009 | Nakai et al. | |
| 2010/0045898 A1* | 2/2010 | Lee et al. ........................ | 349/65 |
| 2012/0001937 A1 | 1/2012 | Tagashira et al. | |

FOREIGN PATENT DOCUMENTS

| | | |
|---|---|---|
| JP | 2000-214804 | 8/2000 |
| JP | 2002-40339 | 2/2002 |
| JP | 2005-221590 | 8/2005 |
| JP | 2005-227324 | 8/2005 |
| JP | 2006-64911 | 3/2006 |
| JP | 2008-34372 | 2/2008 |
| JP | 2009-9080 | 1/2009 |
| WO | WO 2011/036698 A1 | 3/2011 |

OTHER PUBLICATIONS

Japanese Office Action issued Oct. 21, 2014, in Japan Patent Application No. 2011-249894 (with English translation).
Office Action issued Jan. 16, 2015 in Japanese Patent Application No. 2011-249894 (with English translation).

* cited by examiner

*Primary Examiner* — Meghan Dunwiddie
(74) *Attorney, Agent, or Firm* — Oblon, McClelland, Maier & Neustadt, L.L.P.

(57) ABSTRACT

According to one embodiment, a display device includes: a plurality of light guide units; a light source; a support substrate; a first electrode transmissive to light provided on the second major surface; a counter substrate opposed to the second major surface and provided away from the first electrode; a second electrode transmissive to light provided on a surface of the counter substrate opposed to the second major surface; and a plurality of spacers provided between the support substrate and the counter substrate and arranged between adjacent ones of the plurality of light guide units when projected onto a plane parallel to the first direction and the second direction. Optical characteristics in a region which is surrounded by adjacent ones of the spacers, the first electrode and the second electrode are changed by a voltage which is applied between the first electrode and the second electrode.

21 Claims, 10 Drawing Sheets

DISPLAY DEVICE

CROSS-REFERENCE TO RELATED APPLICATION

This application is based upon and claims the benefit of priority from the prior Japanese Patent Application No. 2011-249894, filed on Nov. 15, 2011; the entire contents of which are incorporated herein by reference.

FIELD

Embodiments described herein relate generally to a display device.

BACKGROUND

A display device using a light guide structure includes a plurality of light guide units and a light extraction unit provided on the side surface of each of the plurality of light guide units. In the display device, the light extraction from the side surface of each light guide unit is controlled by changing the light extraction unit physically or chemically. Thereby, images are displayed.

In such a display device using a light guide structure, it is desired to enable easier manufacturing of a structure in which a plurality of light guide units are aligned.

DETAILED DESCRIPTION

Figure 1:
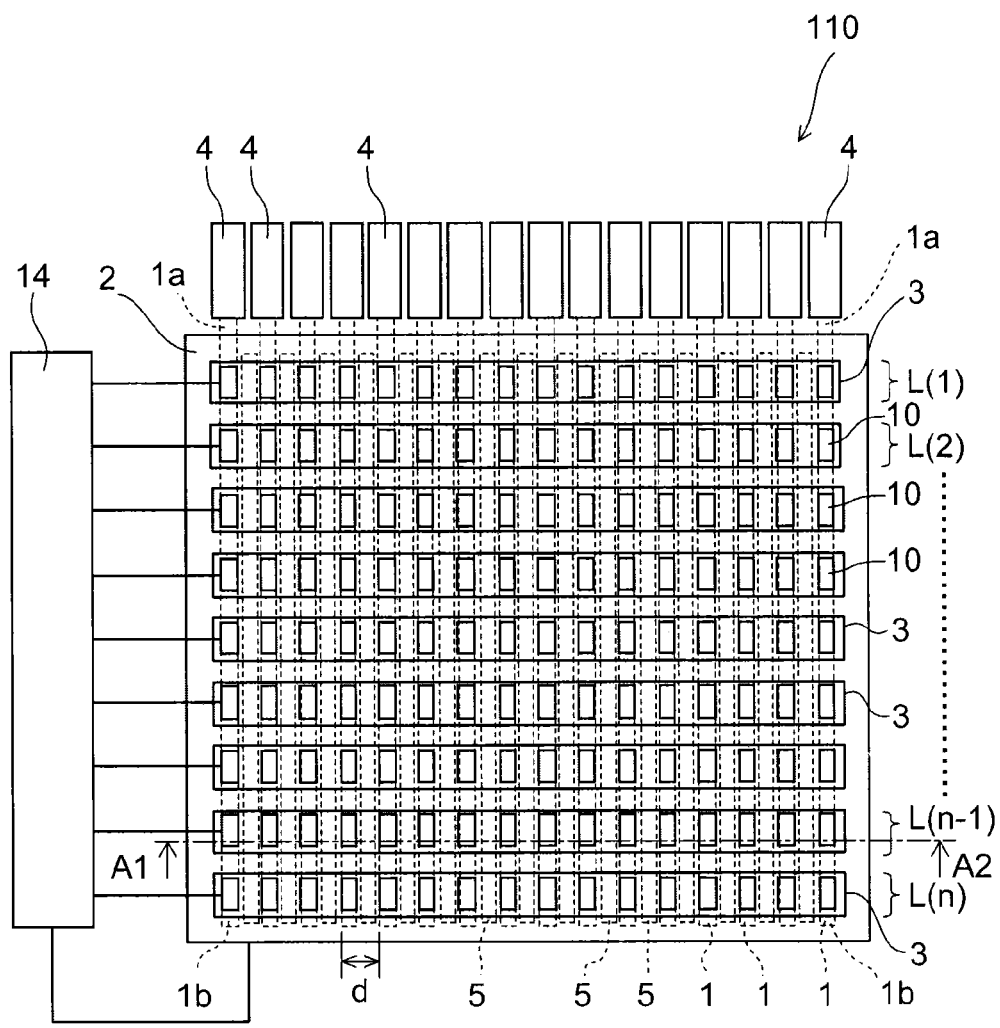
FIG. 1 is a schematic plan view illustrating a display device according to a first embodiment.

In general, according to one embodiment, a display device includes: a plurality of light guide units having one end, another end on an opposite side to the one end, and a side surface extending along a first direction from the one end toward the other end, the light guide units being aligned away from one another in a second direction intersecting with the first direction; a light source configured to cause light to enter the light guide unit from the one end of the light guide unit; a support substrate having a first major surface in contact with the side surface of the light guide unit and a second major surface on an opposite side to the first major surface, a portion of the support substrate in contact with the side surface being transparent; a first electrode transmissive to light provided on the second major surface; a counter substrate opposed to the second major surface and provided away from the first electrode; a second electrode transmissive to light provided on a surface of the counter substrate opposed to the second major surface; and a plurality of spacers provided between the support substrate and the counter substrate and arranged between adjacent ones of the light guide units when projected onto a plane parallel to the first direction and the second direction. Optical characteristics in a region which is surrounded by adjacent ones of the spacers, the first electrode and the second electrode are changed by a voltage which is applied between the first electrode and the second electrode.

Various embodiments will be described hereinafter with reference to the accompanying drawings.

The drawings are schematic or conceptual; and the proportions of sizes among portions, etc. are not necessarily the same as the actual values thereof. Further, the dimensions and proportions may be illustrated differently among drawings, even for identical portions.

In the specification of this application and the drawings, components similar to those described in regard to a drawing thereinabove are marked with the same reference numerals, and a detailed description is omitted as appropriate.

First Embodiment

FIG. 1 is a schematic plan view illustrating a display device according to a first embodiment.

Figure 2:
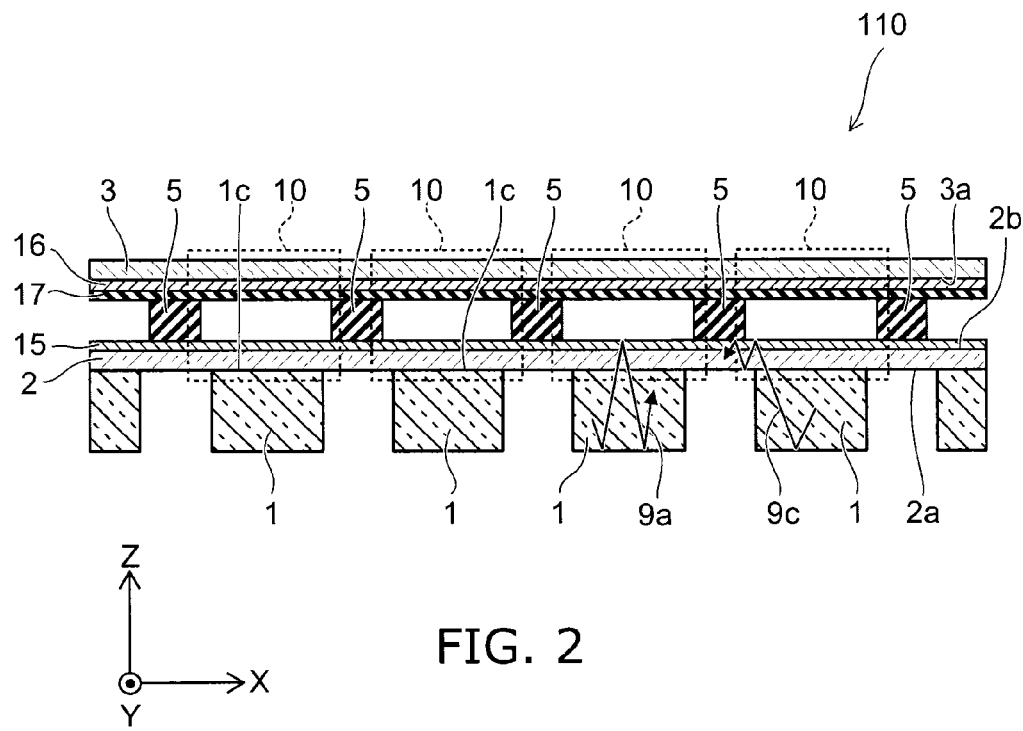
FIGS. 2 and 3 are a schematic cross-sectional view illustrating a display device according to a first embodiment.

FIG. 2 is a schematic cross-sectional view illustrating a cross section taken along line A1-A2 of FIG. 1.

FIG. 2 shows an enlarged cross section of part of the cross section taken along line A1-A2 of FIG. 1.

As shown in FIG. 1, a display device 110 includes a plurality of light guide units 1, light sources 4, a support substrate 2, a first electrode 15, counter substrates 3, second electrodes 16, and a plurality of spacers 5.

The light guide unit 1 has one end 1a, the other end 1b on the opposite side to the one end 1a, and a side surface 1c extending along the Y-axis direction (a first direction) from the one end 1a toward the other end 1b. The light guide unit 1 extends in the Y-axis direction. The plurality of light guide units 1 are aligned away from one another at intervals of d in the X-axis direction (a second direction) intersecting with the Y-axis direction.

The light sources 4 cause light to enter the plurality of light guide units 1 from the one ends 1a. For example, each of the plurality of light sources 4 is connected to the one end 1a of each of the plurality of light guide units 1. The light emitted from the plurality of light sources 4 is propagated from the one ends 1a toward the other ends 1b of the plurality of light guide units 1.

The support substrate 2 has a first major surface 2a in contact with the side surface 1c of the light guide unit 1 and a second major surface 2b on the opposite side to the first major surface 2a. At least a portion of the first major surface 2a in contact with the side surface 1c of the light guide unit 1 is transparent.

The plurality of light guide units 1 are provided away from one another on the first major surface 2a of the support substrate 2. The support substrate 2 functions as a substrate supporting the plurality of light guide units 1.

The support substrate 2 needs only to be optically connected to the plurality of light guide units 1, and may, for example, be fixed by a transparent adhesive or be optically connected by a matching oil.

As shown in FIG. 2, the first electrode 15 is provided on the support substrate 2. The first electrode 15 is a light-transmissive electrode. The first electrode 15 is transmissive to the light emitted from the light source 4. ITO (indium tin oxide), for example, is used for the first electrode 15.

The counter substrate 3 is opposed to the second major surface 2b of the support substrate 2, and is disposed away from the first electrode 15.

The second electrode 16 is provided on the counter substrate 3. The second electrode 16 is a light-transmissive electrode, and is provided on a surface 3a of the counter substrate 3 opposed to the second major surface 2b.

A plurality of second electrodes 16 are provided in the display device 110. Each of the plurality of second electrodes 16 extends in the X-axis direction. The plurality of second electrodes 16 are aligned away from one another in the Y-axis direction.

An insulating film 17 is formed on the first electrode 15 side of the second electrode 16. The insulating film 17 is provided in order to prevent an electrical short circuit between the second electrode 16 and the first electrode 15. The insulating film 17 needs to transmit light in order that light can leak from the support substrate 2 to the counter substrate 3, but may have scattering properties. In this case, the light scattered by the insulating film 17 is extracted to the outside through the counter substrate 3. The insulating film 17 needs to have an enough thickness not to be dielectrically broken by the electric field strength generated by the second electrode 16 and the first electrode 15. If the insulating film 17 is excessively thick, the distance between both electrodes mentioned above is increased and the electrostatic force is reduced.

The plurality of spacers 5 are provided between the support substrate 2 and the counter substrate 3. The spacer 5 is disposed between light guide units 1 when projected onto a plane parallel to the Y-axis direction and the X-axis direction. That is, the spacer 5 is provided on the second major surface 2b and between light guide units 1 as viewed in the Z-axis direction (a third direction) orthogonal to the X-axis direction and the Y-axis direction. The region between the support substrate 2 and the counter substrate 3 is kept at a prescribed spacing by the spacer 5. The spacer 5 is preferably disposed not to overlap with a light extraction portion 10 as viewed in the Z-axis direction.

In the display device 110 according to the embodiment, the optical characteristics of the region surrounded by adjacent spacers 5, the first electrode 15, and the second electrode 16 are changed by the voltage applied between the first electrode 15 and the second electrode 16.

Here, the change in the optical characteristics of the region mentioned above includes changes in transparency and scattering to the light propagated through the light guide unit 1 and a change in the average refractive index to the wavelength of the light.

The region mentioned above is included in the light extraction portion 10. Here, the light extraction portion 10 is a portion where the light propagated through the light guide unit 1 is extracted to the outside. The light extraction portion 10 is provided in a portion where the light guide unit 1 and the second electrode 16 overlap as viewed in the Z-axis direction. The light extraction portion 10 forms a pixel that is a display unit of the display device 110.

The display device 110 is driven by a drive circuit 14. The drive circuit 14 is connected to the first electrode 15 and the second electrode 16.

Here, a mechanism in which a voltage is applied to the light extraction portion 10 to extract light is described.

When a voltage is applied between the first electrode 15 and the second electrode 16 from the drive circuit 14, an electrostatic force is generated between the first electrode 15 and the second electrode 16 in the light extraction portion 10, and the support substrate 2 and the counter substrates 3 come close together. Consequently, part of the light propagated through the light guide unit 1 and the support substrate 2 leaks to the counter substrate 3, and light is extracted to the outside of the light guide unit 1.

On the other hand, when no voltage is applied between the first electrode 15 and the second electrode 16, as shown in FIG. 2, the space in the Z-axis direction between the support substrate 2 and the counter substrate 3 is kept. Consequently, as indicated by optical path 9a, the light propagated through the light guide unit 1 and the support substrate 2 while being totally reflected is not extracted to the outside.

In the case of, for example, a display device including n (n being an integer of 1 or more) pixels in the Y-axis direction, the scan line for extracting light is switched by sequentially applying a voltage in units of scan lines from the first scan line L(1) in the upper portion in the Y-axis direction to the n-th scan line L(n) in the lowermost portion. In the case where the i-th scan line ($1 \leq i \leq n$) is in the light extraction state, light of an appropriate color (wavelength) and intensity enters from the light source 4 into the light guide unit 1 in accordance with the image information of the i-th scan line; thereby, the image of the i-th scan line is displayed. After that, similarly, the (i+1)-th scan line is switched to the light extraction state, and light of an appropriate color (wavelength) and intensity enters from the light source 4 into the light guide unit 1 as the image information corresponding to the (i+1)-th scan line; thereby, the image of the (i+1)-th scan line is displayed. When the scanning from the first scan line L(1) to the n-th scan line L(n) is performed at a speed of 30 or more times per second, images without a flicker feeling are displayed on the entire display device.

Figure 3:
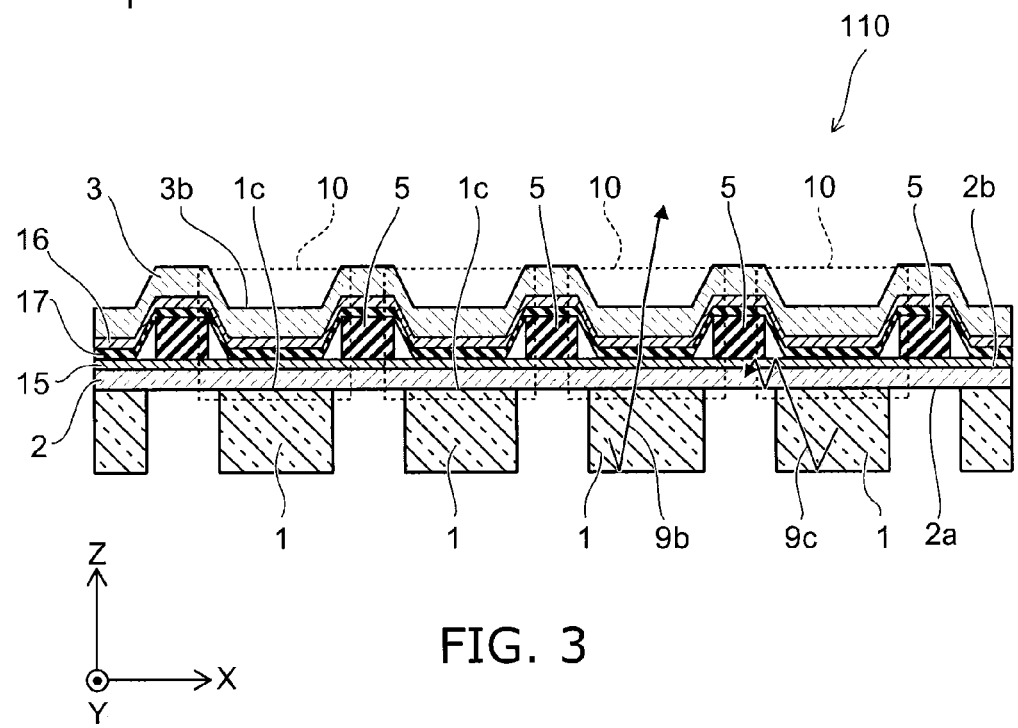

FIG. 3 is a schematic cross-sectional view illustrating a state where a voltage is applied.

FIG. 3 shows an enlarged cross section of part of the cross section taken along line A1-A2 of FIG. 1.

When a voltage is applied between the first electrode 15 and the second electrode 16, as shown in FIG. 3, both electrodes come close together due to the electrostatic force. At this time, both electrodes do not undergo a short circuit because of the existence of the insulating film 17. Consequently, the optical path 9b of the light propagated through the light guide unit 1 travels toward the counter substrate 3. The light of optical path 9b is extracted to the outside by providing the counter substrate 3 with a means for changing the direction of the optical path, for example, providing unevenness (not shown) to a place of a surface 3b of the counter substrate 3 not overlapping with the spacer 5 as viewed in the Z-axis direction.

In the display device 110 according to the embodiment, the spacer 5 and the counter substrate 3 can be formed in a state before the light guide unit 1 is disposed on the first major surface 2a of the support substrate 2, and therefore the spacer 5 and the counter substrate 3 can be formed with good accuracy in a state where the support substrate 2 is fixed to a flat surface. That is, the spacer 5 can be formed with good accuracy on the second major surface 2b of the support substrate 2. Furthermore, the counter substrate 3 can be formed with good accuracy after the spacer 5 is formed. Furthermore, on the first major surface 2a of the support substrate 2, the plurality of light guide units 1 can be accurately arranged in positions not overlapping with the spacer 5 as viewed in the Z-axis direction. Consequently, the height of the spacer 5 can be equalized. The height (the height in the Z-axis direction) of the spacer 5 may be set low to keep the distance between both electrodes short, for example. Thereby, the effect of electrostatic force between the first electrode 15 and the second electrode 16 can be strengthened in the light extraction portion 10.

Like optical path 9c shown in FIG. 2 and FIG. 3, in the light propagated through a light guide unit while being totally reflected, there are a small amount of light components that are propagated through the support substrate 2 while being totally reflected and enter an adjacent light guide unit. The amount of components of optical path 9c is reduced by thinning the support substrate 2.

A specific example of the method for manufacturing the display device 110 will now be illustrated.

As the support substrate 2, for example, a PET (polyethylene terephthalate) film with a thickness of 100 micrometers (μm) is used. ITO is formed on one major surface (the second major surface 2b) of the PET film as the first electrode 15. The ITO has a thickness of, for example, 100 nanometers (nm). On the major surface (the second major surface 2b) on which ITO is formed, for example, a resist with a width of 1 millimeter (mm) and a thickness of 10 μm is formed at intervals of 5 mm. The resist is formed by photolithography and etching. The resist is used as the spacer 5.

In the display device 110, the spacer 5 can be accurately and easily formed on the second major surface 2b of the support substrate 2 by photolithography and etching.

Next, as the counter substrate 3, for example, a PET film with a thickness of 50 μm is used. ITO is formed on one major surface of the PET film as the second electrode 16. The ITO has a thickness of, for example, 100 nm. Further, on the ITO, for example, a silicon oxide film is formed with a thickness of 500 nm as the insulating film 17. Then, the counter substrate 3 provided with the second electrode 16 and the insulating film 17 is superposed on the spacers 5 such that the surface where the insulating film 17 is formed is in contact with the spacers 5, and the insulating film 17 and the spacers 5 are bonded by, for example, thermocompression bonding.

The plurality of light guide units 1 with a width of 4 mm are arranged on the first major surface 2a in, for example, places of the resulting light extraction portions 10 not overlapping with the spacer 5 as viewed in the Z-axis direction, and are bonded to the support substrate 2 by a transparent adhesive (e.g. NOA 81, an ultraviolet curable adhesive, manufactured by Norland Products Inc.). Part of the light guide unit 1 may overlap with the spacer 5 as viewed in the Z-axis direction.

The plurality of light guide units 1 are surely fixed in accurate positions of the first major surface 2a of the support substrate 2.

Next, places of the surface 3b of the counter substrate 3 not overlapping with the spacer 5 as viewed in the Z-axis direction are roughened. A mechanical method or the like, for example, is used for the roughening. Further, the light source 4 is disposed opposite to the one end 1a of the light guide unit 1. The drive circuit 14 is connected to the first electrode 15 provided on the support substrate 2 and the second electrode 16 provided on the counter substrate 3. Thus, the display device 110 is completed.

In the display device 110, the voltage applied from the drive circuit 14 to the first electrode 15 and the second electrode 16 is, for example, 300 volts (V).

To display images using the display device 110, while the light extraction state of the light extraction portion 10 is sequentially switched by scanning, the light control of the light source 4 is performed in synchronization with the switching. In the display device 110 according to the embodiment, images without a flicker are obtained at a scan frequency of 30 Hz or more.

In the display device 110 according to the embodiment, since the spacer 5 can be formed with good accuracy, a characteristic variation of the light extraction portion 10 in the surface of the display device 110 is suppressed.

Figure 4:
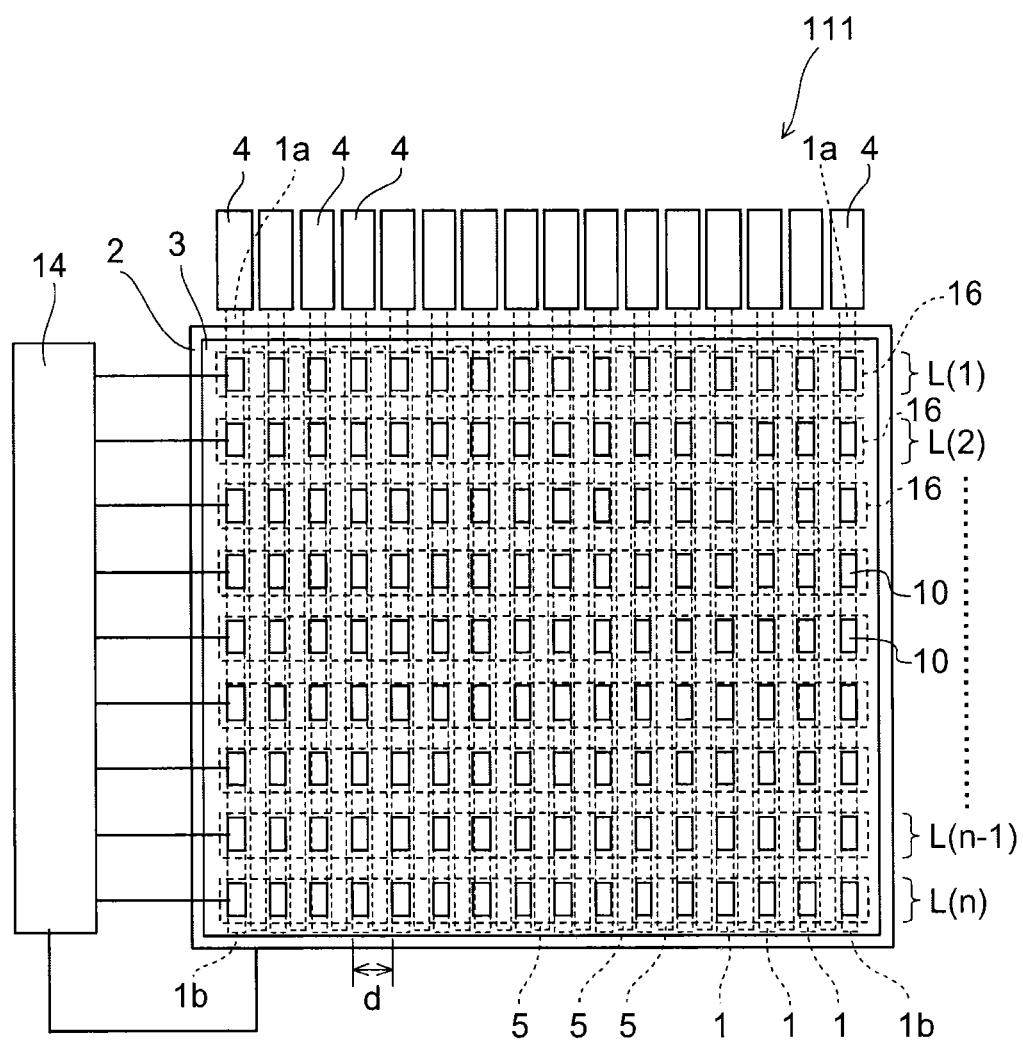
FIG. 4 is a schematic plan view showing another example of the display device according to the first embodiment.

FIG. 4 is a schematic plan view showing another example of the display device according to the first embodiment.

In a display device 111 shown in FIG. 4, the counter substrate 3 is not separated for the scan lines L(1) to L(n). That is, the counter substrate 3 is provided in one body along the XY plane. The counter substrate 3 has the same size as the support substrate 2, for example.

In the case where the counter substrate 3 is made one body, the second electrodes 16 formed on the counter substrate 3 are provided separately for the scan lines L(1) to L(n).

In the display device 111, when a voltage is applied between the first electrode 15 and a selected second electrode 16, the spacing between the support substrate 2 and a portion of the counter substrate 3 corresponding to the region between the first electrode 15 and the selected second electrode 16 becomes smaller due to the electrostatic force. That is, a portion of the counter substrate 3 corresponding to the selected second electrode 16 for voltage application comes close to the support substrate 2, and the optical characteristics of the light extraction portion 10 change. Thereby, light is extracted from the light guide unit 1. On the other hand, when no voltage is applied between the first electrode 15 and the second electrode 16, the support substrate 2 and the counter substrate 3 do not come close together, and light extraction is not performed. That is, the displaying of images by light extraction and suspension of light extraction is performed by the applied voltage between the first electrode 15 and the second electrode 16.

In the display device 111, since the plurality of second electrodes 16 are formed on the counter substrate 3 of one body, the plurality of second electrodes 16 can be formed with accurate intervals. Furthermore, since the counter substrate 3 is one body, the accurate arrangement of the counter substrate 3 on the support substrate 2 can be easily performed.

Second Embodiment

FIG. 5 to FIG. 8 are schematic cross-sectional views illustrating display devices according to a second embodiment.

As shown in FIG. 5 to FIG. 8, display devices 121 to 123 according to the second embodiment differ from the display device 110 according to the first embodiment in that a light absorption unit 60 is included. The light absorption unit 60 is a general term of a first light absorption unit 61 and a second light absorption unit 62. Here, the light absorptance of the light absorption unit 60 is higher than the light absorptance of the support substrate 2. For example, the absorptance of the light absorption unit 60 to the wavelength of the light propagated through the light guide unit 1 is higher than the absorptance of the support substrate 2 to the light of that wavelength. The light propagated through the light guide unit 1 is, for example, light including light of the wavelengths of R (red), G (green), and B (blue) or light including visible light.

Figure 5:
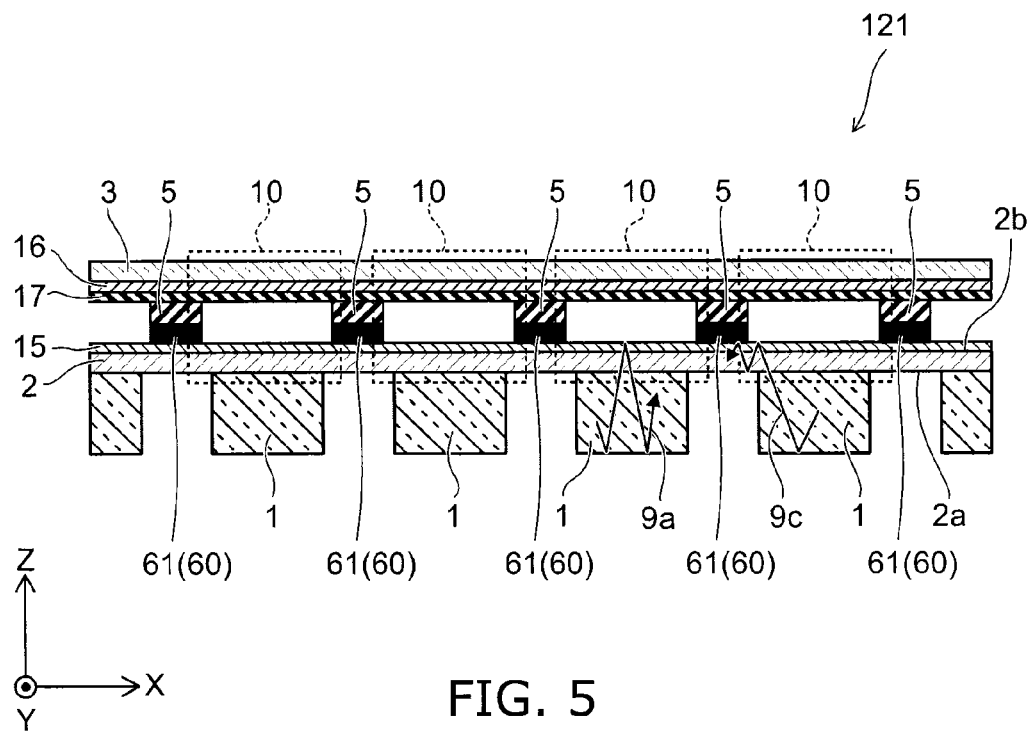
FIG. 5 to FIG. 8 are schematic cross-sectional views illustrating display devices according to a second embodiment.

A display device 121 shown in FIG. 5 includes the first light absorption unit 61 between the spacer 5 and the second major surface 2b of the support substrate 2.

Like optical path 9c shown in FIG. 5, in the light propagated through a light guide unit 1 while being totally reflected, there are a small amount of light components that are propagated through the support substrate 2 while being totally reflected and travel toward an adjacent light guide unit 1. If the components enter the adjacent light guide unit 1, color mixing is caused.

In the display device 121, light leaking from a light guide unit 1 toward an adjacent light guide unit 1 via the support substrate 2 is absorbed when it reaches the first light absorption unit 61. Thereby, arrival of light leaking from a light guide unit 1 at an adjacent light guide unit 1 is suppressed, and occurrence of color mixing is prevented.

Figure 6:
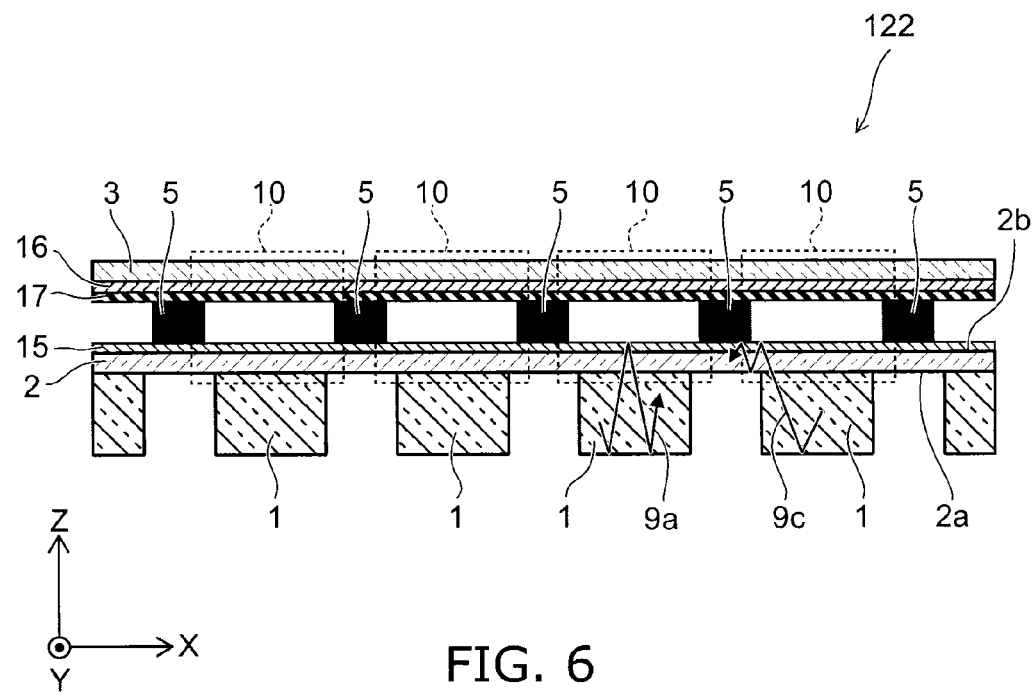

In a display device 122 shown in FIG. 6, the spacer 5 itself has the light absorption function. Also in the display device 122, similarly to the display device 121, light leaking from a light guide unit 1 toward an adjacent light guide unit 1 via the support substrate 2 can be absorbed by the spacer 5 having the light absorption function, and occurrence of color mixing is prevented.

Furthermore, in the display device 122, the spacer 5 absorbs light components propagated through the counter substrate 3 while being totally reflected.

Figure 7:
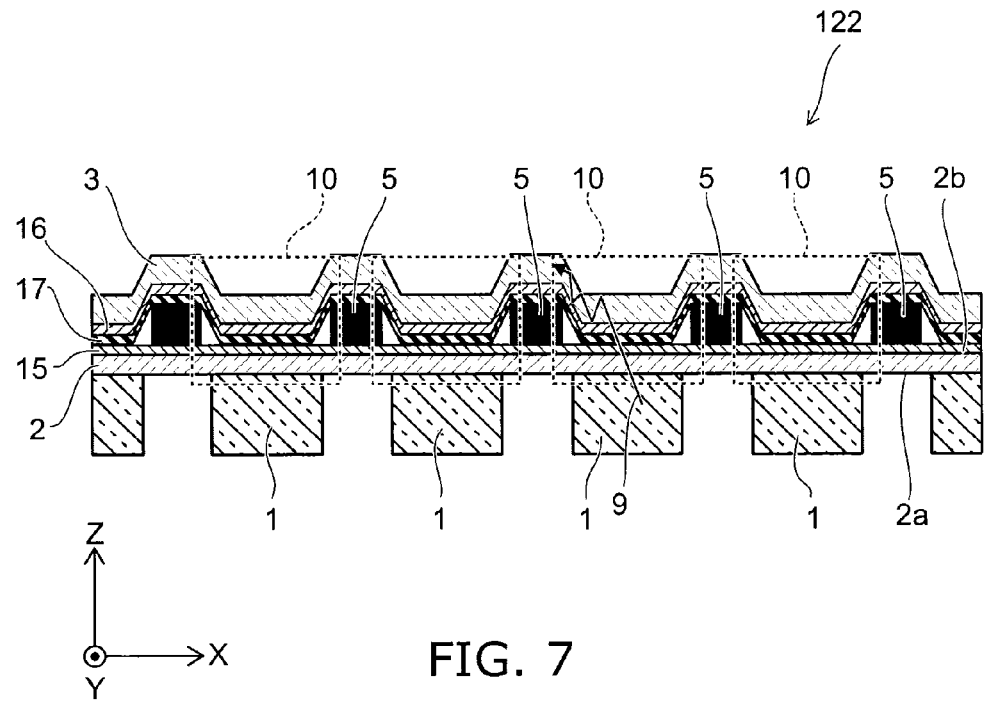

FIG. 7 illustrates a light component propagated through the counter substrate.

As shown in FIG. 7, in the light extracted from the light extraction portion 10 (optical path 9), there is a light component propagated through the counter substrate 3 while being totally reflected. The light component propagated through the counter substrate 3 is absorbed when it reaches the position of the spacer 5.

Furthermore, in the display device 122, when the display device 122 is viewed from the counter substrate 3 side, the spacer 5 that absorbs light is disposed in the space between light guide units 1; therefore, black image becomes darker and the image quality is improved.

Figure 8:
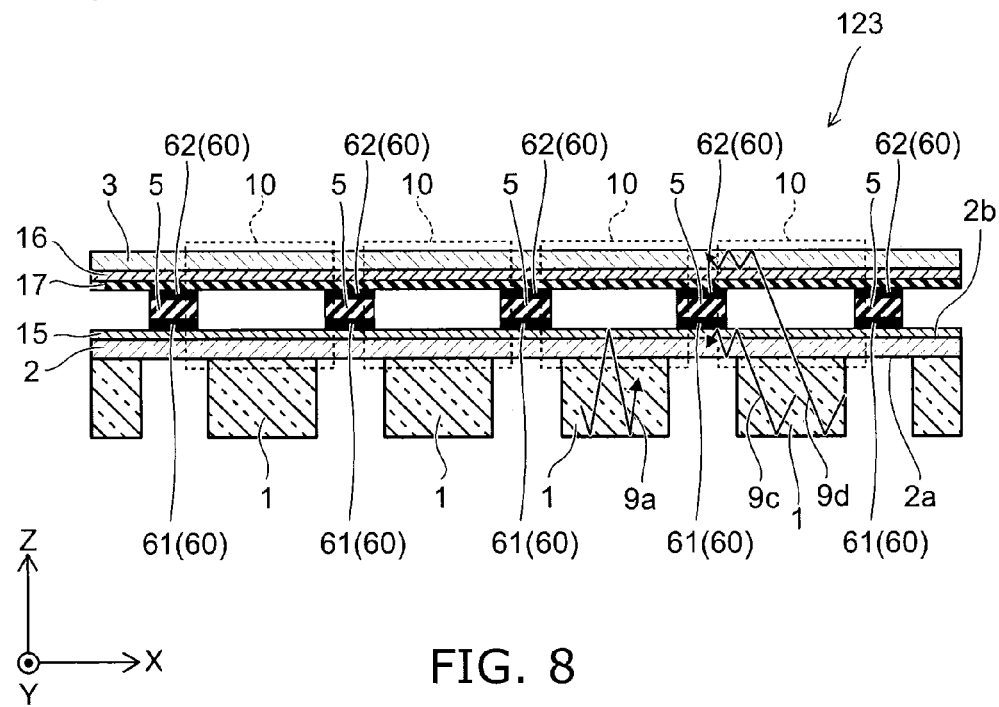

A display device 123 shown in FIG. 8 includes the second light absorption unit 62 between the counter substrate 3 and the spacer 5. The first light absorption unit 61 may be further provided between the support substrate 2 and the spacer 5 like the display device 123 shown in FIG. 8.

In the display device 123, light leaking from a light guide unit 1 toward an adjacent light extraction portion 10 via the counter substrate 3 (optical path 9d) is absorbed when it reaches the second light absorption unit 62. In the case where the first light absorption unit 61 is provided, the first light absorption unit 61 absorbs light leaking from a light guide unit 1 toward an adjacent light guide unit 1 via the support substrate 2 (optical path 9c).

Thereby, arrival of light leaking from a light guide unit 1 at an adjacent light guide unit 1 is suppressed, and occurrence of color mixing is prevented.

In the display devices 121 to 123 according to the second embodiment, by forming the first light absorption unit 61, the spacer 5 having the light absorption function, and the second light absorption unit 62 on the support substrate 2, color mixing between adjacent light guide units 1 can be prevented. Thus, display devices 121 to 123 with high image quality can be easily manufactured.

Third Embodiment

Figure 9:
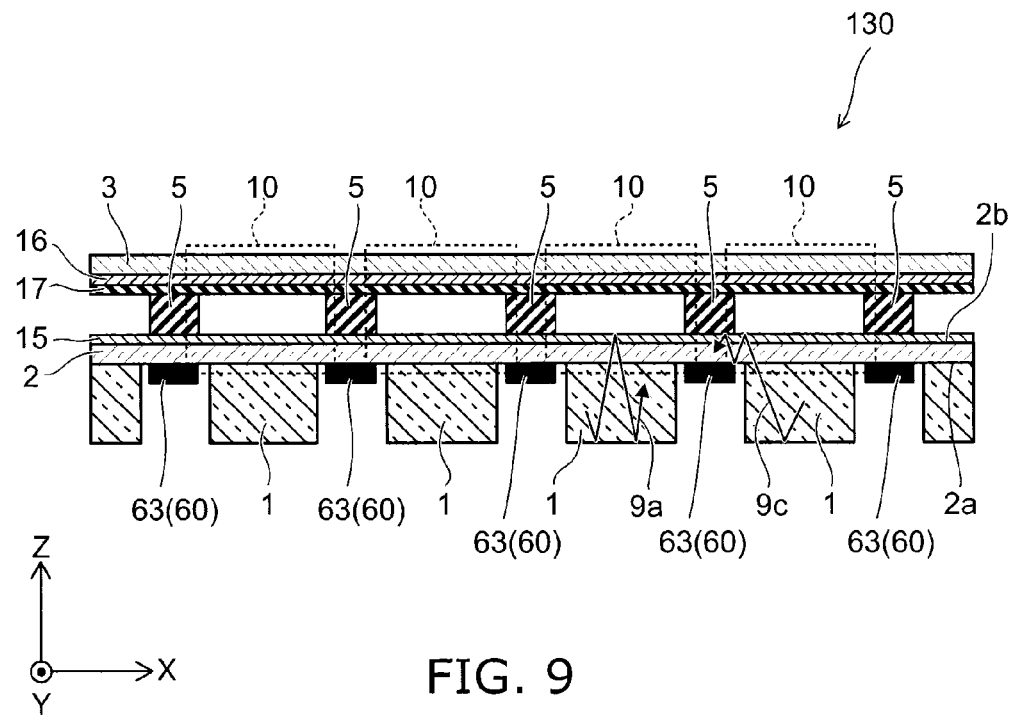
FIG. 9 is a schematic cross-sectional view illustrating a display device according to a third embodiment.

FIG. 9 is a schematic cross-sectional view illustrating a display device according to a third embodiment.

As shown in FIG. 9, a display device 130 according to the third embodiment includes a third light absorption unit 63 individually between light guide units 1 on the first major surface 2a of the support substrate 2.

In the display device 130 shown in FIG. 9, the third light absorption unit 63 is formed between light guide units 1 using a printing technique such as the ink jet method. Black ink, for example, is used for the third light absorption unit 63.

In the display device 130, similarly to the display devices 121 to 123 according to the second embodiment, spread of leak light propagated through the support substrate 2 is suppressed, and color mixing is prevented.

A recess may be provided in a place of the first major surface 2a of the support substrate 2 where the third light absorption unit 63 will be printed, and black ink or the like may be applied into the recess. Thereby, the black ink or the like soaks into the support substrate 2, and the effect of suppressing leak light propagated through the support substrate 2 is enhanced.

In the display device 130 according to the third embodiment, by forming the third light absorption unit 63 on the support substrate 2, color mixing between adjacent light guide units 1 can be prevented similarly to the display devices 121 to 123 according to the second embodiment. Thus, a display device 130 with high image quality can be easily manufactured.

Fourth Embodiment

Figure 10:
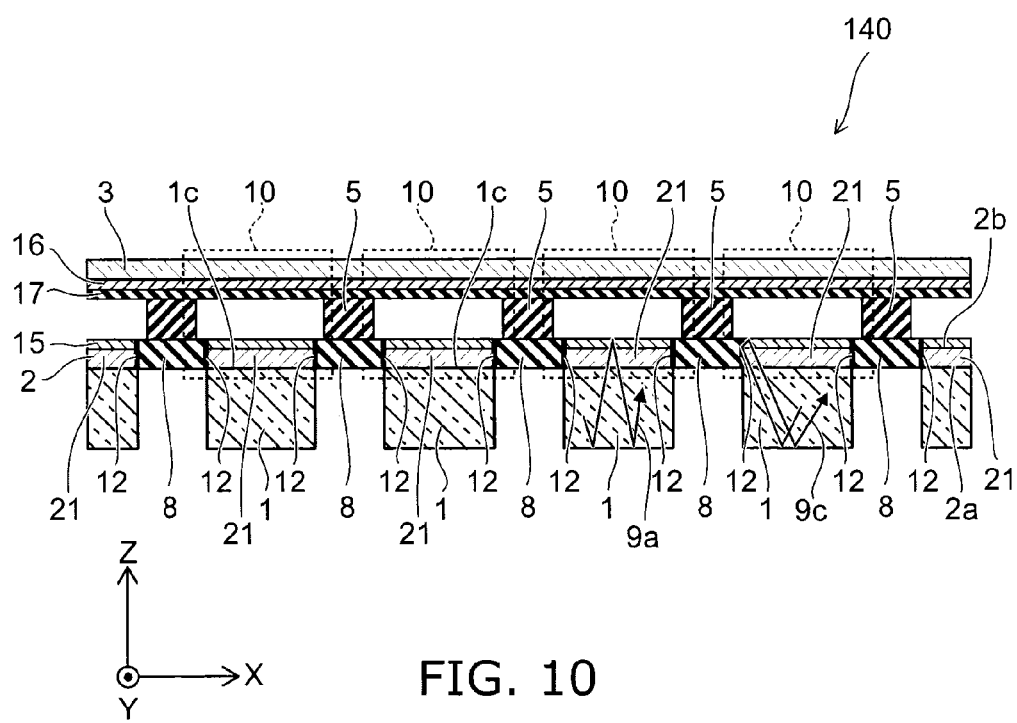
FIG. 10 is a schematic cross-sectional view illustrating a display device according to a fourth embodiment.

FIG. 10 is a schematic cross-sectional view illustrating a display device according to a fourth embodiment.

As shown in FIG. 10, a display device 140 according to the fourth embodiment includes a second isolation unit 8 in the support substrate 2.

The second isolation unit 8 is provided individually between light guide units 1 in the support substrate 2. That is, the second isolation unit 8 has a reflection surface 12 normal to the X-axis direction.

The second isolation unit 8 is a first prism extending in the Y-axis direction and having a rectangular cross-sectional shape in the XZ plane, and is made of a high reflectance material such as aluminum. The second isolation unit 8 may be also a structure in which the surface of a prism made of a material not having a high reflectance such as an acrylic or glass is coated with a high reflectance material such as aluminum. On the other hand, a first portion 21 other than the second isolation unit 8 is similarly formed of a second prism extending in the Y-axis direction and having a rectangular cross-sectional shape in the XZ plane. After the first prism and the second prism extending in the Y-axis direction are alternately aligned on the XY plane along the X-axis direction, pressurization and heating are performed so that the prisms may come into contact with one another in the X-axis direction; thereby, the prisms are connected to one another. Thus, the support substrate 2 can be obtained.

In the display device 140 thus configured, leak light propagated through the support substrate 2 is reflected at the reflection surface 12, and then returns toward the light guide unit 1 from which the leak light leaks. Consequently, spread of leak light propagated through the support substrate 2 is suppressed. Therefore, color mixing is prevented in the display device 140.

In the display device 140 according to the fourth embodiment, by forming a light reflection unit 8 in the support substrate 2, color mixing between adjacent light guide units 1 can be prevented. Thus, a display device 140 with high image quality can be easily manufactured.

Fifth Embodiment

Figure 11:
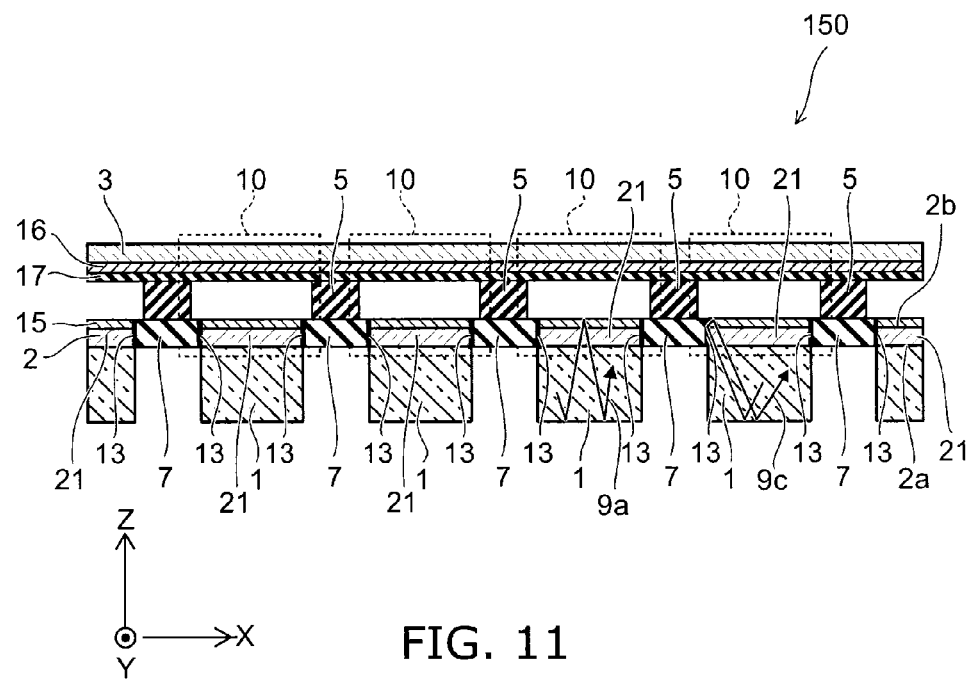
FIG. 11 is a schematic cross-sectional view illustrating a display device according to a fifth embodiment.

FIG. 11 is a schematic cross-sectional view illustrating a display device according to a fifth embodiment.

As shown in FIG. 11, a display device 150 according to the fifth embodiment includes a third isolation unit 7 in the support substrate 2.

The third isolation unit 7 is provided individually between light guide units 1 in the support substrate 2.

The refractive index of the third isolation unit 7 is lower than the refractive index of the support substrate 2.

The third isolation unit 7 is the first prism extending in the Y direction and having a rectangular cross-sectional shape in the XZ plane, and is made of a fluorine-based material with a low refractive index. On the other hand, the first portion 21 other than the third isolation unit 7 is similarly formed of the second prism extending in the Y direction and having a rectangular cross-sectional shape in the XZ plane. After the first prism and the second prism extending in the Y-axis direction are alternately aligned on the XY plane along the X-axis direction, pressurization and heating are performed so that the prisms may come into contact with one another in the X direction; thereby, the prisms are connected to one another. Thus, the support substrate 2 can be obtained.

The third isolation unit 7 is formed such that the normal line to the interface between the first portion 21 and the third isolation unit 7 lies along the direction in which the light guide units 1 are arranged (the X-axis direction). The interface forms a total reflection surface 13. Of the leak light propagated through the support substrate 2, light satisfying the total reflection condition is reflected at the total reflection surface 13, and then returns toward the previous position. Consequently, spread of leak light is suppressed, and color mixing is prevented.

In regard to light not satisfying the total reflection condition, a situation is created in which total reflection is repeated in a larger amount in the vertical direction (the Z-axis direction) than in the lateral direction (the X-axis direction) for the light components entering the light guide unit 1 and propagated therethrough. That is, by increasing the amount of components traveling vertically, the amount of total reflection is increased at the total reflection surface 13. Specifically, this is achieved by inclining the optical axis of the light entering from the one end 1a of the light guide unit 1 toward the direction of the normal line to the first major surface 2a of the support substrate 2.

In the display device 150 according to the fifth embodiment, by forming the isolation unit 7 in the support substrate 2, color mixing between adjacent light guide units 1 can be prevented. Thus, a display device 150 with high image quality can be easily manufactured.

Sixth Embodiment

Figure 12:
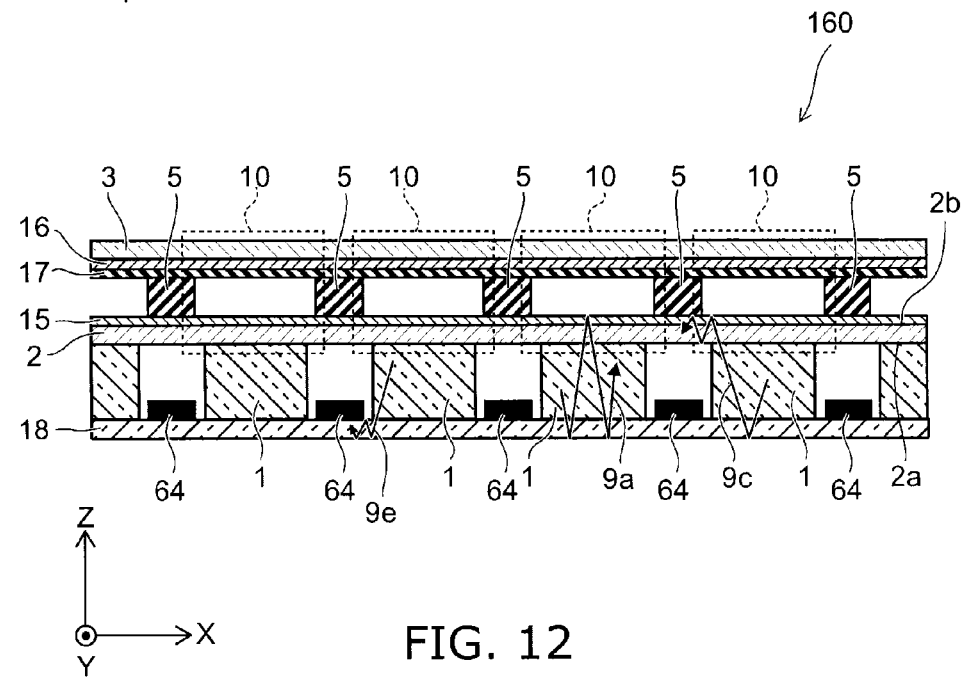
FIG. 12 is a schematic cross-sectional view illustrating a display device according to a sixth embodiment.

FIG. 12 is a schematic cross-sectional view illustrating a display device according to a sixth embodiment.

As shown in FIG. 12, a display device 160 according to the sixth embodiment further includes a protection substrate 18. The protection substrate 18 is provided on the opposite side of the light guide unit 1 from the support substrate 2. That is, the light guide unit 1 is disposed between the support substrate 2 and the protection substrate 18. The protection substrate 18 is connected to the light guide unit 1 by, for example, a transparent adhesive.

In the display device 160, since the light guide unit 1 is covered with the protection substrate 18, flawing, dust adhesion, etc. to the light guide unit 1 can be prevented.

In the display device 160, a fourth light absorption unit 64 (a fourth light absorption unit) may be provided on the protection substrate 18. The fourth light absorption unit 64 is provided between light guide units 1 on the surface of the protection substrate 18. The fourth light absorption unit 64 absorbs light leaking from a light guide unit 1 toward an adjacent light guide unit 1 via the protection substrate 18 (optical path 9e).

Thereby, arrival of light leaking from a light guide unit 1 at an adjacent light guide unit 1 is suppressed, and occurrence of color mixing is prevented.

In the display device 160 according to the sixth embodiment, since the light guide unit 1 is covered with the protection substrate 18, flawing and dust adhesion to the light guide unit 1 can be prevented. Consequently, a display device 160 in which degradation in image quality in manufacturing processes or in use is suppressed can be easily manufactured.

Seventh Embodiment

Figure 13:
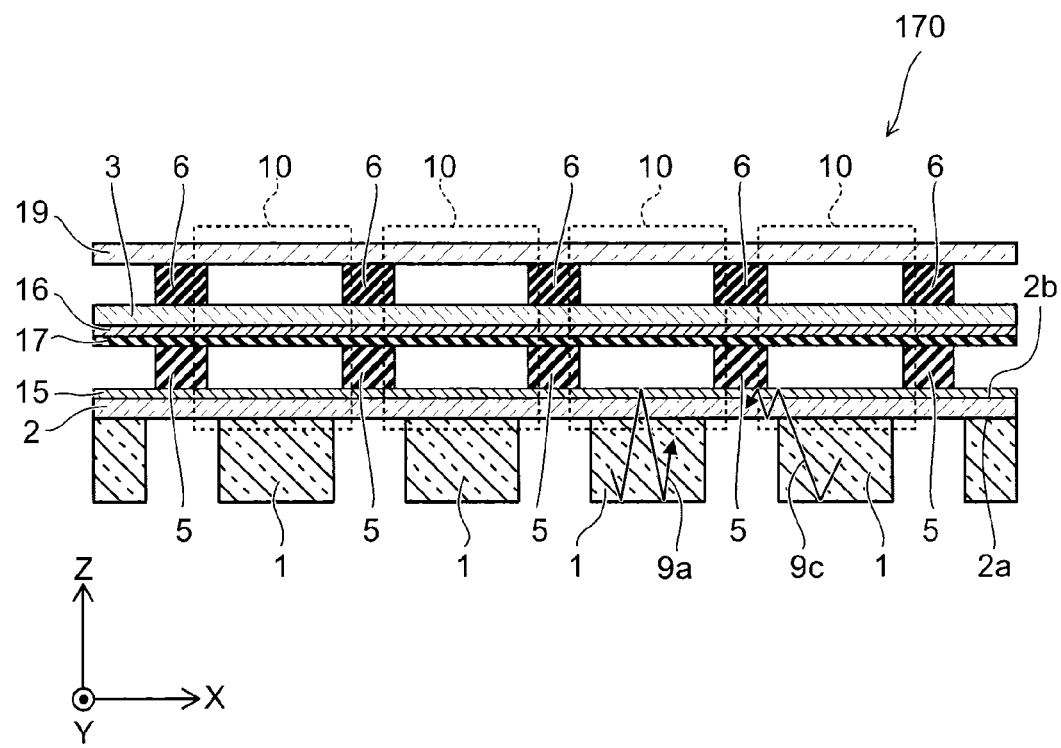
FIG. 13 is a schematic cross-sectional view illustrating a display device according to a seventh embodiment.

FIG. 13 is a schematic cross-sectional view illustrating a display device according to a seventh embodiment.

As shown in FIG. 13, a display device 170 according to the seventh embodiment includes a protection substrate 19 on the opposite side of the counter substrate 3 from the support substrate 2.

The protection substrate 19 is, for example, provided away from the counter substrate 3 via support units 6 (e.g. props). The support unit 6 is, for example, provided in a position overlapping with the spacer 5 as viewed in the Z-axis direction. At this time, the height of the support unit 6 is adjusted so that the counter substrate 3 may be disposed in a middle position between the support substrate 2 and the protection substrate 19 in the Z-axis direction. Thereby, the counter substrate 3 can be disposed on a neutral plane of the light extraction portion 10, and influence on the operation of the counter substrate 3 that is a movable part is suppressed when the display device 170 is driven in a bent state.

In the display device 170 according to the seventh embodiment, by providing the protection substrate 19 above the counter substrate 3, factors in interfering with operations, such as contact to the counter substrate or adhesion of water and dust to the counter substrate, can be prevented. Thus, a display device 170 with improved reliability can be easily manufactured.

In all the embodiments described above, the support substrate 2 and the counter substrate 3 may be formed of, for example, a thin resin film to provide the display device with flexibility.

Figure 14A:
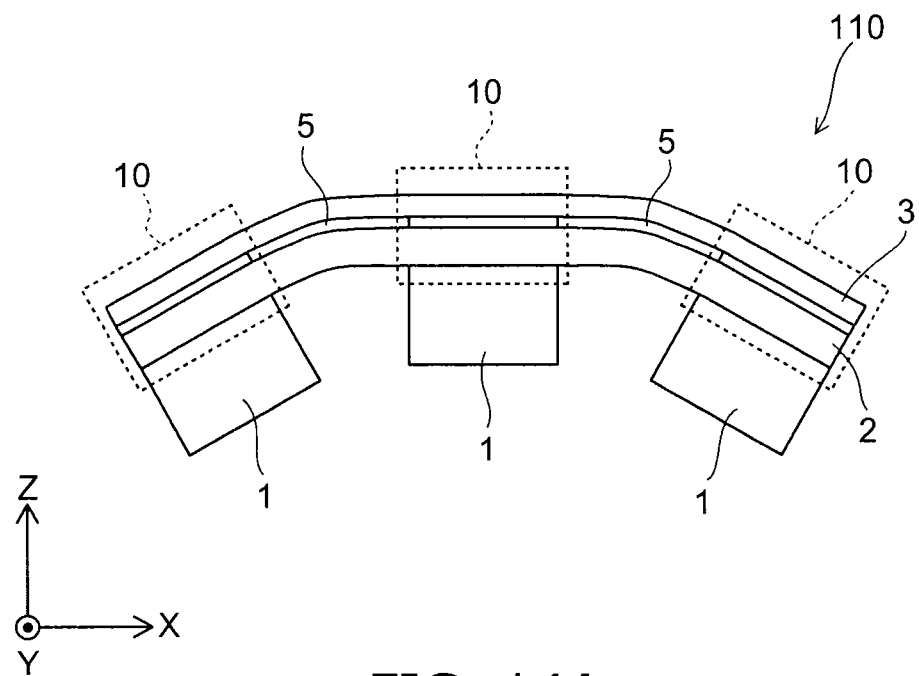
FIGS. 14A and 14B are schematic cross-sectional views illustrating a display device that is bent.
Figure 14B:
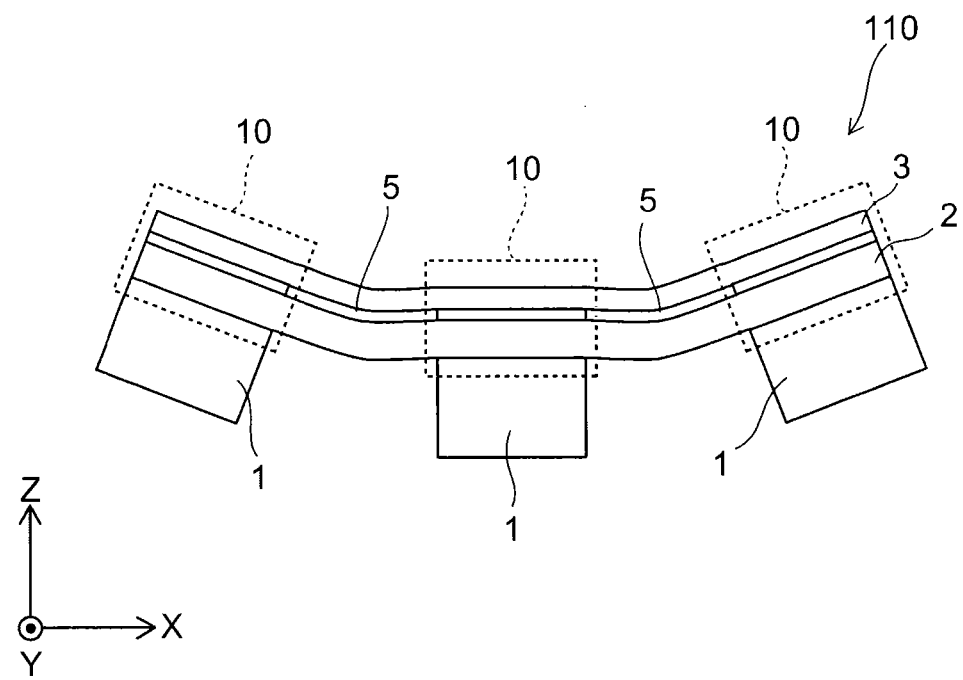

FIGS. 14A to 14B are schematic cross-sectional views illustrating a display device that is bent.

FIG. 14A shows an example in which the counter substrate 3 side of the display device 110 is bent in a convex manner, and FIG. 14B shows an example in which the counter substrate 3 side of the display device 110 is bent in a concave manner.

In the display device 110, the plurality of light guide units 1 extend in the Y-axis direction, and are arranged away from one another in the X-axis direction. Therefore, by the existence of the space between light guide units 1, even when the support substrate 2 and the counter substrate 3 are bent, the display device 110 can be provided with flexibility to the extent that the light guide units 1 do not interfere with one another.

As shown in FIG. 14A, in the case where the display device 110 is bent such that the opposite side to the light guide unit 1 becomes convex, since the spacing between light guide units 1 is narrowed, bending is possible to the extent that the light guide units 1 do not interfere with one another.

As shown in FIG. 14B, in the case where the display device 110 is bent such that the opposite side to the light guide unit 1 becomes concave, since the spacing between light guide units 1 is widened, bending is possible without the problem of interference between light guide units 1.

Although the protection substrates 18 and 19 are not shown in FIGS. 14A to 14B, in the display devices 160 and 170 including the protection substrates 18 and 19, the display devices 160 and 170 can be provided with flexibility similarly to the above by using, for example, a thin resin film to form the support substrate 2, the counter substrate 3, and the protection substrates 18 and 19.

Figure 15:
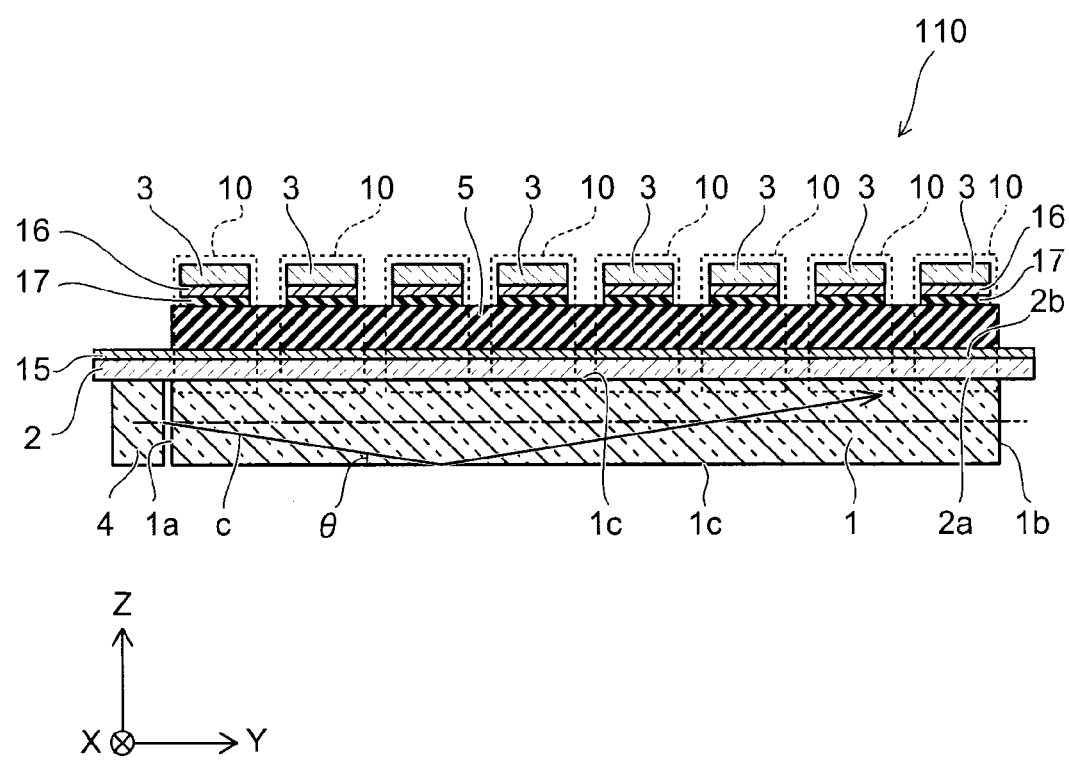
FIG. 15 is a schematic view showing an example of the optical axis of the display devices according to the embodiments.

FIG. 15 is a schematic view showing an example of the optical axis of the display devices according to the embodiments.

FIG. 15 shows a schematic cross section of the light guide unit 1 as viewed in the X-axis direction. The optical axis of the light source 4 is preferably non-parallel to the first major surface 2a of the support substrate 2.

The angle θ between the optical axis c of the light incident on the one end 1a of the light guide unit 1 from the light source 4 and the first major surface 2a (the side surface 1c) is greater than 0 degrees and smaller than 90 degrees−θc, where θc is the critical angle at the interface between the light guide unit 1 and air. Thereby, light is propagated with good efficiency while repeating total reflection at the upper and lower side surfaces 1c of the light guide unit 1.

The optical axis c is preferably substantially parallel to a plane including the Z-axis direction and the Y-axis direction. Thereby, leakage of light propagated through a light guide unit 1 to an adjacent light guide unit 1 is suppressed.

In the case where the intensity distribution (e.g. the FFP; the far field pattern) of the light emitted from the light source 4 is in an elliptical form, the direction of the light source 4 may be set so as to form an ellipse longer in the direction (the Z-axis direction) orthogonal to the first major surface 2a. Thereby, the amount of components in the direction (the Z-axis direction) orthogonal to the first major surface 2a of the light incident on the light guide unit 1 can be made larger than the amount of components in a direction (the X-axis direction) parallel to the first major surface 2a. Thereby, light is propagated with good efficiency while the amount of total reflection at the upper and lower side surfaces 1c of the light guide unit 1 is made larger than the amount of total reflection at the right and left side surfaces 1c.

The embodiments described above illustrate the light extraction portion 10 by an example in which the electrostatic force by the voltage applied between the first electrode 15 and the second electrode 16 is used to bring the support substrate 2 and the counter substrate 3 close together to change the optical characteristics. However, the examples of the light extraction portion 10 are not limited thereto. For example, a liquid crystal layer may be interposed between the first electrode 15 and the second electrode 16 in the light extraction portion 10, and the refractive index of the liquid crystal layer may be changed by the voltage applied between the first electrode 15 and the second electrode 16.

The embodiment provides an easily manufacturable display device.

Hereinabove, embodiments of the invention are described with reference to specific examples. However, the embodiment of the invention is not limited to these specific examples. For example, one skilled in the art may appropriately select specific configurations of components of display devices such as light sources, light guide units, support substrates, counter substrates, and spacers from known art and similarly practice the invention. Such practice is included in the scope of the invention to the extent that similar effects thereto are obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display device comprising:
    a plurality of light guides, one of the light guides having one end, another end on an opposite side to the one end, and a side surface extending along a first direction from the one end toward the other end, the light guides being arranged away from one another in a second direction intersecting with the first direction;
    a light source to cause light to enter the light guides from the one end;
    a first substrate having a first surface in contact with the side surface, a portion of the first substrate in contact with the side surface being transparent;
    a second substrate, the first substrate being provided between the second substrate and the light guides
    a first electrode provided between the second substrate and the first substrate, the first electrode being transmissive to the light;
    a second electrode provided between the second substrate and the first substrate, the second electrode being transmissive to the light; and
    a plurality of spacers provided between the first substrate and the second substrate and arranged between the light guides when projected onto a plane parallel to the first direction and the second direction,
    optical characteristics in a region surrounded by adjacent ones of the spacers, the first electrode, and the second electrode being changed by a voltage applied between the first electrode and the second electrode.

2. The device according to claim 1, wherein light propagated through the one of the light guides is emitted from the one of the light guides to an outside of the one of the light guides by a change in a refractive index of the region.

3. The device according to claim 1, wherein
    the second substrate is provided in a plurality,
    the second substrates extend in the second direction, and
    the second substrates are arranged in the first direction away from one another.

4. The device according to claim 1, further comprising a light absorber provided at at least one of a first position, a second position and a third position, the first position being between the first substrate and the spacer, the second position being between the spacer and the second substrate, the third position being between the light guides on the first surface, the light absorber having a light absorptance higher than a light absorptance of the first substrate.

5. The device according to claim 1, wherein a light absorptance of the spacer is higher than a light absorptance of the first substrate.

6. The device according to claim 1, further comprising a plurality of reflectors provided in portions of the first substrate between adjacent ones of the light guides as viewed in a third direction orthogonal to the first direction and the second direction, each of the reflectors having a reflection surface normal to the second direction.

7. The device according to claim 1, further comprising an isolator provided in a portion of the first substrate between adjacent ones of the light guides as viewed in a third direction orthogonal to the first direction and the second direction, the isolator having an interface normal to the second direction, a refractive index of the isolator being lower than a refractive index of the first substrate.

8. The device according to claim 1, wherein an optical axis of the light incident on the one end from the light source is non-parallel to the first surface.

9. The device according to claim 8, wherein the optical axis is parallel to a plane which includes the first direction and a third direction, the third direction being orthogonal to the first direction and the second direction.

10. The device according to claim 1, further comprising a third substrate, the light guides being disposed between the third substrate and the first substrate.

11. The device according to claim 10, further comprising a light absorber having a light absorptance higher than a light absorptance of the first substrate, the light absorber being provided between the light guides on the third substrate.

12. The device according to claim 10, wherein the light guides are covered with the third substrate.

13. The device according to claim 1, wherein the region overlaps the light guides and the second substrate in a third direction orthogonal to the first direction and the second direction.

14. The device according to claim 1, wherein the region emits the light guided through one of the light guides toward an outside of the one of the light guides by the first substrate and the second substrate coming close together by an electrostatic force generated between the first substrate and the second substrate.

15. The device according to claim 1, further comprising a third substrate, the second substrate being disposed between the first substrate and the third substrate.

16. The device according to claim 15, further comprising a support unit provided between the second substrate and the third substrate, at least a part of the support unit overlapping at least one of spaces in a third direction orthogonal to the first direction and the second direction.

17. The device according to claim 1, wherein the first substrate and the second substrate have flexibility.

18. The device according to claim 1, further comprising a plurality of first light absorber provided individually in portions of the first substrate between the light guides as viewed in a third direction orthogonal to the first direction and the second direction, the first light absorber having an absorptance with respect to the light higher than an absorptance with respect to the light of the first substrate.

19. The device according to claim 1, wherein an angle between an optical axis of light incident on the one end from the light source and the first surface is greater than 0 degrees and smaller than an angle of (90 degrees−θc), where θc is in unit of degree and is a critical angle at an interface between the one of the light guides and air.

20. The device according to claim 1, wherein a shape of an intensity distribution of light emitted from the light source is an ellipse which is longer in a third direction orthogonal to the first direction and the second direction.

21. The device according to claim 1, wherein the light guides are made to be contact with the first surface of the first substrate after a structural body including the first substrate, the second substrate, the first electrode, the second electrode and the spacers is formed.

* * * * *